United States Patent [19]

Rundell et al.

[11] 4,069,661
[45] Jan. 24, 1978

[54] VARIABLE MIXER PROPULSION CYCLE

[75] Inventors: Dan Joseph Rundell, Milford; Donald Patrick McHugh, Cincinnati; Tom Foster, Cincinnati; Ralph Harold Brown, Cincinnati, all of Ohio

[73] Assignee: The United States of America as represented by the United States National Aeronautics and Space Administration, Washington, D.C.

[21] Appl. No.: 583,055

[22] Filed: June 2, 1975

[51] Int. Cl.² .......................... F02K 3/06; F02C 3/04
[52] U.S. Cl. ........................................ 60/204; 60/262
[58] Field of Search ................... 60/226 R, 262, 271, 60/224, 264

[56] References Cited

U.S. PATENT DOCUMENTS

| | | | |
|---|---|---|---|
| 3,060,679 | 10/1962 | Schmitt | 60/224 |
| 3,060,680 | 10/1962 | Wilde et al. | 60/242 |
| 3,161,018 | 12/1964 | Sandre | 60/262 |
| 3,280,564 | 10/1966 | Keenan et al. | 60/262 |
| 3,352,110 | 11/1967 | Cresswell | 60/262 |
| 3,797,233 | 3/1974 | Webb et al. | 60/226 R |
| 3,841,091 | 10/1974 | Sargisson et al. | 60/262 |

FOREIGN PATENT DOCUMENTS 1,306,025  9/1962  France ................................ 60/262

*Primary Examiner*—Carlton R. Croyle
*Assistant Examiner*—Robert E. Garrett
*Attorney, Agent, or Firm*—James W. Johnson, Jr.; Norman T. Musial; John R. Manning

[57] ABSTRACT

A design technique, method and apparatus for controlling the bypass gas stream pressure and varying the bypass ratio of a mixed flow gas turbine engine in order to achieve improved performance. The disclosed preferred embodiments each include a unique mixing device for combining the core and bypass gas streams which includes means for varying the area at which the bypass stream is injected into the core stream. The variable area mixing device permits the static pressures of the core and bypass streams to be balanced prior to mixing at widely varying bypass stream dynamic pressure levels. The ability to balance the core and bypass stream static pressures at widely varying bypass stream dynamic pressures permits the mixed flow gas turbine engine of this invention to operate efficiently over a wide range of bypass ratios and further permits the dynamic pressure of the bypass stream to be maintained at a level which will keep the engine inlet airflow matched to an optimum design level throughout a wide range of engine thrust settings.

To further assist in maintaining a static pressure balance between the core and bypass streams prior to mixing, the variable area mixing device may be provided with means to accelerate the bypass stream to supersonic velocities immediately prior to mixing combined with means to control the degree of expansion of the bypass stream after it has been accelerated to supersonic and before it is mixed with the core stream. To increase the flexibility in adjusting the dynamic pressure of the bypass stream and provide the potential for a relatively high thrust level without the use of an afterburner, the system may be modified by the use of a split fan section in conjunction with two concentric bypass ducts.

20 Claims, 7 Drawing Figures

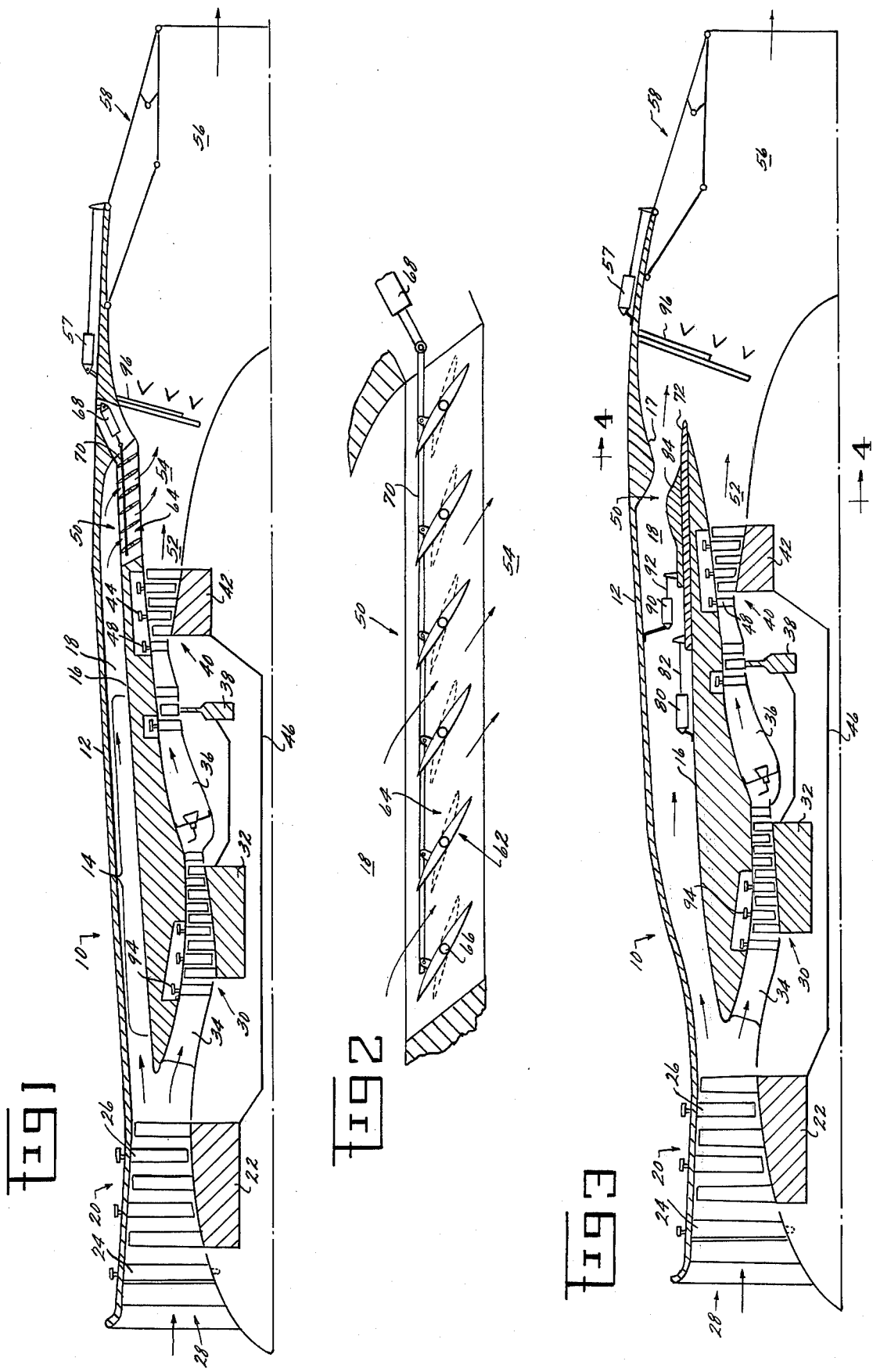

VARIABLE MIXER PROPULSION CYCLE

BACKGROUND OF THE INVENTION

The invention relates to a mixed flow gas turbine engine of the bypass type and, more particularly, to a mixed flow gas turbine engine suitable for powering aircraft wherein the engine bypass ratio may be controlled to satisfy particular engine operating conditions.

Considerable attention has been devoted to developing a gas turbine engine with the high specific thrust characteristics of a turbojet or low bypass turbofan at supersonic speeds which can also be configured to exhibit the lower specific thrust, low noise and low fuel consumption characteristics of a high bypass turbofan at subsonic speeds in order that a mixed-mission aircraft may be developed.

To this end, modern aircraft designers have worked to develop the aircraft engine design criteria which would enable the development of a suitable mixed-mission aircraft. Several design approaches to this problem have been offered. Such prior art systems have included various concepts of retractable fans, variable area turbines, variable pitch fans, as well as more complex techniques such as those utilizing combinations of turbofan and turbojet engines in tandem or concentric flow relation. In addition to a lack of flow flexibility, these arrangements have the obvious disadvantage of being inefficient due to the dead weight associated with those engine components not used in all modes of flight.

More recent attempts at developing practical variable bypass ratio engines include the selective direction of the inlet fan stream through alternative upstream fan ducts using inverter valves. While more effective than prior attempts at achieving satisfactory mixed-mission performance, such systems have exhibited several negative characteristics. These include the addition of extra undesired length, weight and complexity to the engine.

A further disadvantage of prior art variable bypass ratio engines is that they have failed to meet desired performance goals in all modes of operation because they have insufficient flow variability to maintain satisfactory engine performance in both supersonic and subsonic flight.

One of the reasons that prior art variable bypass mixed flow engines lack a high degree of flow variability is that in order to avoid the large shock losses which result from the direct mixing of two streams of significantly different static pressures, the static pressures of the core and bypass streams must be balanced prior to mixing. In prior art mixed flow engines the static pressure of the bypass stream is controlled by setting the dynamic pressure of the bypass stream. Thus, in order to balance the core and bypass stream pressures prior to mixing, the bypass stream dynamic pressure and resultant static pressure must be maintained at a level at which the core and bypass stream static pressures are nearly equal immediately prior to mixing. However, since the engine bypass ratio which is defined as the ratio of the bypass flow to core stream flow is dependent upon the bypass stream dynamic pressure, the core stream static pressure effectively determines the bypass ratio at which prior art engines may operate, without experiencing the relatively large shock losses which result from not balancing the core and bypass stream static pressures prior to mixing. This interdependence of the core stream static pressures in the mixing region and the dynamic pressure of the bypass stream has prevented prior art variable bypass mixed flow engines from operating efficiently throughout a wide range of bypass ratios and thrust levels.

Another reason prior art mixed flow engines have not operated efficiently throughout a variable velocity range is that they experience significantly high inlet drag levels during low thrust flight. Typically, the inlet of a gas turbine engine is sized to be full at the maximum thrust of the engine. However, as engine thrust is decreased below the maximum thrust, the engine airflow demand is considerably less than the total airflow supplied to the inlet. This excess airflow to the inlet causes inlet spillage drag which significantly increases the installed fuel consumption of prior art mixed flow engines.

OBJECT OF THE INVENTION

It is therefore a primary object of this invention to provide a mixed flow gas turbine engine in which a static pressure balance may be achieved between the core and bypass streams prior to mixing at widely varying bypass stream dynamic pressures.

It is also an object of this invention to provide a mixed flow gas turbine engine having a high degree of flow modulation such that engine inlet airflow may be maintained at a matched design level as the engine thrust level and bypass ratio is varied in order that the engine will operate efficiently throughout a variable velocity range.

It is a further object of this invention to provide a mixed flow gas turbine engine which may be configured to operate at various velocities between subsonic and supersonic without any abrupt changes or discontinuities in engine airflow.

A further object of this invention is to provide a mixed flow gas turbine engine having a variable area mixing device for changing the area at which the bypass stream is injected into the core stream.

A further object of this invention is to provide a variable area mixing device for a gas turbine engine which may include means immediately upstream of the mixing region to accelerate the bypass stream to supersonic velocity and thereafter control the degree of flow expansion of the bypass stream prior to mixing.

A still further object of this invention is to provide a mixed flow gas turbine engine which may include a split fan section and two concentric bypass ducts in conjunction with a variable area mixing device to further increase the flexibility in adjusting the dynamic pressure level of the bypass stream and provide the potential for production of relatively higher thrust levels without the use of an afterburner.

SUMMARY OF THE INVENTION

These and other objects of the invention have been achieved in the preferred embodiments of the invention wherein a mixed flow gas turbine engine is provided with a fan; core engine comprising a compressor, combustor and high pressure turbine, all in serial flow connection; and at least one annular duct concentric to the core engine for bypassing a portion of the fan airflow around the core engine. The gas stream exhausted from the high pressure turbine is directed to a low pressure turbine which drives the fan through an upstream extending drive shaft. The unique mixing device described herein is provided downstream of the core engine to mix the core and bypass gas streams. The mixed stream is exhausted through a common variable area exhaust nozzle.

In order to control the static pressure of the bypass stream immediately upstream of the mixing region and maintain a static pressure balance between the core and bypass streams prior to mixing over a wide range of bypass stream dynamic pressures, the mixing device includes a means for varying the area through which the bypass stream is injected into the core stream. To further increase the flexibility in maintaining a static pressure balance between the core and bypass streams prior to mixing at relatively high bypass stream pressures, the mixing device may also include means for accelerating the bypass stream to supersonic velocity and thereafter controlling the degree of bypass stream expansion prior to injection into the core stream.

Additional variable geometry components may be added to the engine to achieve a greater degree of thrust modulation at varying bypass ratios. Thus, the low pressure turbine may be provided with variable area nozzle diaphragm to assist in adjusting the low and high pressure turbine rotor speeds while allowing wide swings in low pressure turbine extraction rates during the high bypass mode of operation. The core engine compressor may be provided with sufficient variable geometry to permit stall free operation from engine startup to full speed. Additional thrust may be provided by the use of an afterburner downstream of the mixing device.

To further increase the flexibility in adjusting the dynamic pressure of the bypass stream and to provide the potential to produce relatively high thrust levels without the use of an afterburner, the system may be modified by the use of a split fan section in conjunction with two concentric bypass ducts as disclosed in U.S. patent application Ser. No. 445,438, filed by Bernard L. Koff et al on Feb. 25, 1974 and assigned to the same assignee as this invention.

BRIEF DESCRIPTION OF THE DRAWINGS

The invention may be better understood upon reading the following description of the preferred embodiments in conjunction with the accompanying drawings wherein:

FIG. 1 is a cross-sectional view of a mixed flow gas turbine engine incorporating the variable bypass concepts of this invention.

FIG. 2 is a fragmented view of a portion of the gas turbine engine of FIG. 1 in a different mode of operation.

FIG. 3 is a cross-sectional view of another embodiment for a gas turbine engine incorporating the variable bypass concepts of this invention.

DESCRIPTION OF THE PREFERRED EMBODIMENT

Figure 4:
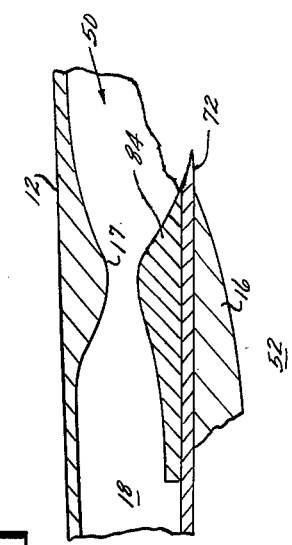
FIG. 4 is a cross-sectional view of the variable area mixing device of this invention taken along the line 4—4 of FIG. 3.

Referring to FIG. 1 there is shown a mixed flow gas turbine engine 10 having an outer casing or nacelle 12 spaced apart from an inner core engine 14 by an inner annular wall member 16 so as to define an annular bypass duct 18 therebetween. The mixed flow engine 10 includes a fan section 20 having a three-stage rotor 22, inlet guide vanes 24 and stators 26 disposed between rotor stages and extending radially inward from the outer nacelle 12. The fan section 20 receives the inlet airflow from an inlet shown generally at 28, and thereupon pressurizes the airflow, a portion of which is delivered to the core engine 14 and the remainder of which is directed to the bypass duct 18. The inlet 28 is sized to accept a predetermined design airflow. The core engine includes an axial flow compressor 30 having a rotor 32. Pressurized air entering the compressor 30 through a flow annulus 34 is compressed and then discharged to a combustor 36 where fuel is burned to provide high energy combustion gases which drive a high pressure turbine rotor 38. The high pressure turbine rotor 38 operates to extract energy from the high pressure core gas stream exiting the combustion chamber 36, and to convert some of this energy into shaft horsepower for driving the rotor stages 32 of the compressor 30.

Disposed downstream of the high pressure turbine 38, in a position to receive the flow of hot gases leaving the core engine 14, is a low pressure turbine 40. The low pressure turbine 40 includes a rotor 42 and variable pitch stator sections 44. While the rotor 42 has been illustrated as comprising three stages, it will be apparent to those skilled in the art that a smaller or greater number of stages may be utilized depending upon the turbine energy extraction potential required. The stator sections 44 operate to convert energy from the core stream into shaft horsepower and to deliver this power to the rotor 42 which, in turn, drives the rotor 22 of fan section 20 through an upstream extending driveshaft 46 connected for rotation with rotors 22 and 42. For the purpose of providing additional control of the core engine flow, a variable area nozzle diaphragm 48 may be provided upstream of the low pressure turbine rotor 42.

The cross-sectional flow area to the low pressure turbine rotor 42 may be varied by varying the pitch of the variable nozzle diaphragm 48 and the variable stator sections 44 which vary the back pressure on the high pressure turbine rotor and thereby assist in adjusting the high pressure turbine rotor speed. Downstream of the core engine a variable area mixing device 50 is provided to mix the bypass duct flow with the combustion gases discharged from the low pressure turbine nozzle 52 in the region designated generally as 54 which may also be referred to as the mixing region. Propulsive force is obtained by the discharge of the mixed flow through a variable area converging-diverging exhaust nozzle 56. In order to assist in modulating the flow in the bypass duct and core engine, the area of the exhaust nozzle 56 may be varied by suitable variable geometry means well known in the art which, as illustrated, may comprise a linear actuator 57 controlling a hinged wall assembly 58 to vary the cross-sectional area of the exhaust nozzle 56 to accelerate the flow exhausting therefrom in the manner well known in the art.

In the embodiment of FIG. 1 the variable area mixing device 50 includes a plurality of cascaded rotatable vanes 62 which span a plurality of passages 64 in the inner wall 16 separating the bypass duct 18 and core engine 14 at a point downstream of the low pressure turbine 40. Each of the vanes 62 are mounted for rotation about their respective midpoint 66.

The vanes 62 are cascaded for simultaneous rotation by a suitable actuator means, which may comprise a linear actuator 68 acting through a control arm 70. While the vanes 62 have been illustrated as commonly controlled it will be apparent that each of the vanes 62 may be provided with separate control means (not shown) such that each may be independently rotated if additional flexibility is required in adjusting the area of the variable area mixing device 50. The rotatable vanes 62 provide the means by which the area through which the bypass stream is injected into the region of confluence 54 with the core stream, is varied. Rotation of the vanes 62 to a near vertical position as shown in FIGS. 1 and 2 increases the area through which the bypass stream is injected into the mixing region 54 while rotating one or more of the vanes 62 to a near horizontal position (as best illustrated in phantom in FIG. 2) decreases the area through which the bypass stream is injected into the mixing region 54.

The ability to vary the area at which the bypass stream is injected into the mixing region 54 permits the mixed flow engine of this invention to achieve a static pressure balance between the core and bypass streams prior to mixing at widely varying bypass ratios. In operation, the desired thrust level and bypass ratio is set by adjusting the dynamic pressure levels of the core and bypass stream. Contemporaneous therewith, the vanes 62 are rotated to either decrease or increase the area through which the bypass stream is injected into the core stream as required to maintain a static pressure balance between the core and bypass streams prior to mixing. Decreasing the area through which the bypass stream is injected into the core stream increases the velocity of the bypass stream and thereby its dynamic pressure relative to its static pressure such that a static pressure variance is achieved at a lower bypass ratio. Similarly, increasing the area through which the bypass stream is injected into the core stream decreases the velocity of the bypass stream and thereby its dynamic pressure relative to its static pressure such that a static pressure balance is achieved at a higher bypass ratio. The added flexibility which the variable area mixing device 50 provides in adjusting the static pressure of the bypass stream immediately prior to mixing enables a single static pressure level of the bypass stream immediately upstream of the mixing region to be achieved at varying bypass stream dynamic pressure levels and thereby enables the core and bypass stream static pressures to be balanced prior to mixing throughout a wide range of engine bypass ratios.

The variable area mixing device 50 also permits the airflow to the engine inlet 28 to be maintained at a matched design level throughout a wide range of engine thrust levels thereby avoiding the inlet spillage drag associated with prior art mixed flow engines and significantly increasing installed fuel consumption. In low thrust flight the engine airflow demand is prevented from falling below the airflow supplied to the inlet by increasing the dynamic pressure level of the bypass stream and resultant bypass ratio. A static pressure balance is maintained between the core and bypass streams prior to mixing by suitably adjusting the area through which the bypass stream is injected into the core stream utilizing the variable area mixing device 50. While the variable area mixing device 50 has been described as operating between partially open and full open positions, it is also possible to operate the engine in a separated flow mode by rotating the vanes 62 to a fully closed position. Operation of a gas turbine engine in such a mode is described in a copending application, Ser. No. 583,056, filed June 2, 1975 by J. E. Johnson et al entitled "Variable Cycle Gas Turbine Engine" and assigned to the same assignee as this invention.

For relatively high bypass ratios it may be necessary to accelerate the bypass stream to supersonic velocities prior to mixing in order to balance the core and bypass stream static pressures prior to mixing. Referring to FIGS. 3 through 6, therein is shown another embodiment for the variable area mixing device 21 of this invention which permits the bypass flow to be accelerated prior to injection into the core stream and permits even greater flexibility in balancing the core and bypass stream static pressures prior to mixing at varying bypass stream dynamic pressure levels. In this embodiment, the inner wall 16 separating the core and bypass streams terminates downstream of the low pressure turbine 40 and the bypass duct 18 is terminated by an annular centerbody 17 generally convex in cross-section which is secured to the inner face of the nacelle 12 such that its convex face extends into the bypass duct 18. The mixing device 50 comprises an inner circumferential ring 72 translatably disposed about the bypass duct wall 16. The wall 16 may include one or more circumferentially spaced axial channels or grooves 74 along its outer periphery for receipt of a like number of circumferentially spaced axial teeth or splines 76 on the inner wall of the ring 72 so as to guide translation of the ring 72 along the wall 16, as best seen in FIG. 4. Suitable actuator means are provided to translate the inner ring 72 along the wall 16. The actuator means may comprise, as illustrated in FIG. 3, a linear actuator 80 having a control arm 82 in driving engagement with the inner ring 72. The variable area mixing device 50 further comprises an outer circumferential ring 84 generally convex in cross-section translatably disposed about the inner ring 72. The outer ring 84 may include one or more circumferentially spaced axial channels or grooves 86 along its inner periphery for receipt of a like number of circumferentially spaced axial teeth or splines 88 on the outer periphery of the inner ring 84, as best seen in FIG. 4. The ring 84 is provided with a suitable actuator for translation, which may comprise a second linear actuator 90 having a control arm 92 in fixed engagement with the outer ring 84 to translate the outer ring 84 along the inner ring 72.

Figure 5:
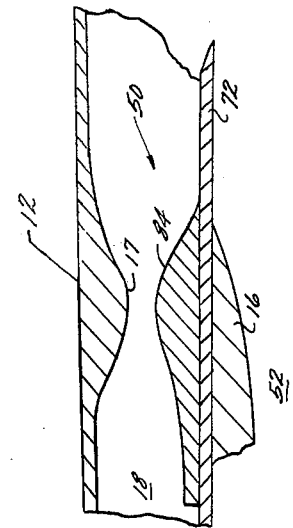
FIG. 5 is a fragmented view of a portion of the gas turbine engine of FIG. 3 in a different mode of operation.
Figure 6:
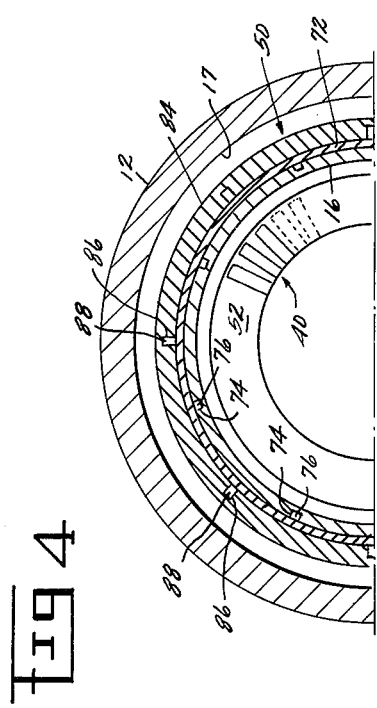
FIG. 6 is a fragmented view of a portion of the gas turbine engine of FIG. 3 in still another mode of operation.

In operation, the outer ring 84 cooperates with the fixed centerbody 17 to restrict or "choke" the bypass duct flow. The area of the bypass duct flow at the choke point is the point of minimum cross-sectional area of the bypass duct and is adjusted by axial translation of the outer ring 84. Downstream translation of the outer ring 84 decreases the area at the choke point, as best seen in FIG. 5. Upstream translation of the ring 84 increases the area at the choke point, as best seen in FIG. 3. The degree of expansion of the bypass duct flow beyond the choke point is determined by the axial position of the inner ring 72. Downstream translation of the inner ring 72 permits a greater expansion of the bypass duct flow prior to mixing, as best seen in FIG. 6. Upstream translation of the inner ring 72 provides a lesser degree of expansion for the bypass duct flow prior to mixing, as best seen in FIGS. 3 and 5. This embodiment, thus, permits the degree of expansion of the bypass stream beyond the choke point to be varied. This feature has particular utility when the dynamic and static pressure levels of the bypass stream are significantly greater than the dynamic and static pressure levels of the core stream. Under such conditions, in order to decrease the static pressure of the bypass stream to the relatively low static pressure level of the core stream, it may be necessary to first accelerate the bypass stream to supersonic velocities and thereafter expand the bypass stream sufficiently to reduce the static pressure level of the bypass stream to the static pressure level of the core stream. The bypass duct flow is caused to accelerate to supersonic velocity by adjusting the axial position of the outer ring 84; thereafter the bypass duct flow is permitted to expand to the degree required to balance the core and bypass pressure prior to mixing by adjusting the axial position of the inner ring 72.

It is well known that substantial reductions in installed drag usually associated with high engine airflow can normally be achieved by holding the engine airflow at its maximum power level while simultaneously increasing the exhaust nozzle area. In conventional mixed flow engines the dynamic pressure level of the bypass stream is strongly influenced by the dynamic pressure level maintained in the exhaust nozzle. Thus, increasing the exhaust nozzle area decreases the dynamic pressure in the bypass stream which often causes the low pressure compressor to operate at low efficiency, thereby offsetting any improvements in installed fuel consumption gained by increasing the exhaust nozzle area. The ability to modulate the bypass stream dynamic duct pressure of the present invention independent of the exhaust nozzle pressure and the ability to independently control the operating conditions of the low pressure turbine makes it possible to accomplish the aforementioned reduction in afterbody drag by increasing the exhaust nozzle area while maintaining a relatively high bypass duct pressure.

Further flow flexibility of the engine of the present invention may be achieved by providing the compressor 30 with variable pitch stator blades 94 so that they may operate as a valve to increase or decrease cross-sectional flow area to the compressor. To even further modulate the bypass ratio and maintain a matched inlet airflow during all modes of operation, the fan 20 may also include a variable pitch rotor mechanism. To provide additional thrust augmentation in the high thrust low bypass mode of operation, an afterburner 96 may be provided downstream of the core engine 14.

The flexibility provided by the variable bypass characteristic of this invention permits selection of core temperature, bypass and pressure ratio for optimum performance at an airflow which is matched to inlet size and flight conditions to provide efficient operation during all modes of flight. To further improve part throttle high bypass performance, a modification of the bypass engine of FIG. 1 may be desirable. One such modification is illustrated in the embodiment of FIG. 7.

Figure 7:
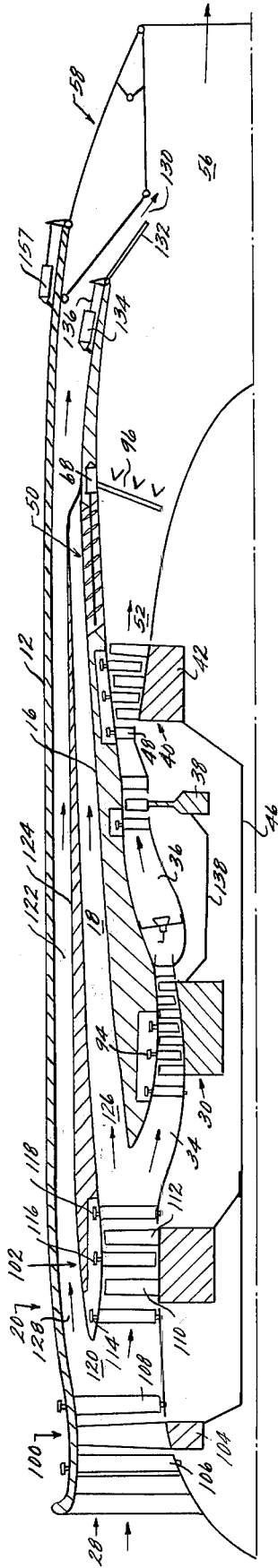
FIG. 7 is a cross-sectional view of a split fan double bypass gas turbine engine incorporating the variable bypass concepts of this invention.

Referring now to FIG. 7, where like numbers refer to previously identified components, there is shown a double-bypass, split fan gas turbine engine incorporating the variable mixing device of the present invention and which provides improved flow flexibility over the embodiment of FIG. 1. In this embodiment, the fan section 20 of the engine is divided into two sections, a front fan section 100 and an aft fan section 102, of the type described in U.S. patent application, Ser. No. 445,438 filed by Bernard L. Koff et al on Feb. 25, 1974 and assigned to the same assignee as this invention. Front fan section 100 includes a first rotatable fan rotor stage 104 disposed between stators 106 and 108. The aft fan section 102 downstream of the front fan section 100 includes a fan rotor having two stages of rotor blades 110 and 112, with associated inlet guide vane 114 and stator blades 116 and 118 disposed between alternate rotor blades 110 and 112. Although the front fan section 100 has been illustrated as comprising a single rotor section 104, and aft fan section 102 has been illustrated as comprising a double rotor section 110 and 112, additional rotor sections may be added to each fan section, and/or the ratio of front fan rotor sections to aft fan rotor sections may be altered to any desired configuration.

The fan stages 100 and 102 are axially displaced from one another by an axial space designated generally at 120. In the present embodiment, each of the fan stator stages incorporates a variable pitch characteristic. The pitch variation of the stators 106 and 108 of the front fan section, inlet guide vane 114 and stators 116 and 118 of the aft fan section operate as a valve to define the cross-sectional area of the engine which is open to airflow at the respective planes thereof and assist in determining the quantity of air drawn through each respective fan stage in a single revolution during operation thereof so as to maximize the flexibility in adjusting the bypass ratio of the variable bypass engine of this invention while maintaining the inlet airflow matched to the design level throughout varying modes of operation. In addition to an inner bypass duct 18, as illustrated in FIG. 1, the embodiment of this invention provides a second outer bypass duct 122. The inner bypass duct 18 is defined between the core engine nacelle 16 and an intermediate nacelle 124. The inlet 126 to the inner bypass duct 18 is disposed downstream of the aft fan stage 102. As a result, airflow directed through duct 18 will have been compressed by fan stages 100 and 102. The outer bypass duct 122 is defined between the intermediate nacelle 124 and the outer engine nacelle 12, and is disposed concentric to the radial exterior of the innermost bypass duct 18. The outer bypass duct 122 has an inlet 128 disposed within the axial space 120 between the front and aft fan stages. Due to this arrangement, air directed through inlet 128 and outer bypass duct 122 will have been compressed only by the front fan stage 100.

The exhaust system for this embodiment differs from that of the embodiment of FIGS. 1 and 3 in that a second variable area exhaust nozzle 130 is provided to exhaust the flow from the outer bypass duct 122. To control the area of the nozzle 130, an annular hinged panel 132 is secured to the downstream end of the intermediate nacelle 124. A suitable actuator 134 is provided having a control arm 136 in fixed engagement with the panel 132, is provided to pivot the panel 132 about the downstream end of the intermediate nacelle 124 and thereby control the area of the nozzle 130. The flow through the inner bypass duct 18 is injected into the core engine exhaust stream through a variable area mixing device 50 as in the manner of the embodiment of FIG. 2.

The flow through the outer bypass duct is exhausted through the nozzle 130 where it is mixed with the combined flows from the inner bypass duct 18 and core engine 14. The combined flows are then accelerated and discharged through the variable area nozzle system 56 in the manner of the embodiment of FIG. 1.

The low pressure turbine 40 supplies rotational energy to the front and aft fan sections 100 and 102 through upstream extending driveshaft 46 connected to low pressure turbine rotor 42 and the fan rotors 104, 110 and 112. The fan driveshaft 46 is rotatably independent of the compressor driveshaft 138 such that these two shafts may be independently controlled in their respective velocities of rotation.

Although rotor 104 of the front fan section 100 and rotors 110 and 112 of the aft fan section 102 maintain the same rotational speed by virtue of their connection to the same driveshaft 46, the airflow between these two fan sections is not identical by virtue of the separately controlled variable inlet guide vane and stator for each respective fan section. Thus, front fan section 100 may be low or high-flowed through the use of variable stators 106 and 108 while aft fan section 102 may be high or low-flowed by utilization of variable inlet guide vane 114, and variable stators 118 and 120. While rotor 104 of front fan section 100 and rotors 110 and 112 of aft fan section 102 have been shown as connected to the same driveshaft 46, it is also possible, with more complexity, to utilize separate driveshafts for each of these rotor sections. In such an embodiment, not here illustrated, a second low pressure turbine may be provided with its own separate upstream extending driveshaft to drive the front fan section.

The dual fan sections of this embodiment, when combined with the variable area mixing device 50, permit a greater amount of matched inlet airflow thrust modulation in the high bypass mode than is possible with the single bypass duct embodiment of FIG. 1. By virtue of the presence of fan ducts 18 and 122 (having their inlets 126 and 128 respectively disposed as described above) a predetermined quantity of airflow entering inlet 28 may be divided between and routed through the outer bypass duct 122 and the aft fan section 102. The air entering the aft fan section 102 is further compressed and then divided between and routed through the inner bypass duct 18 and the core compressor 30. By control of the respective variable stators and inlet guide vane for the aft fan section 102 and compressor 30, and by control of the area of bypass nozzle 130 and core nozzle 56, the total inlet airflow is divided between the outer bypass duct 122, the inner bypass duct 18, and the core compressor 30 in varying proportions so that the bypass ratio may be varied over a wide range while maintaining the total engine inlet airflow at the matched design level. More particularly, increasing the proportion of total airflow which is directed to the bypass ducts 18 and 122, while reducing flow through the core engine 14, results in a higher bypass ratio, while decreasing the proportion of total airflow through the bypass ducts 18 and 122, while increasing the airflow through the core engine 14 results in a lower bypass ratio.

The disposition of the inlet 126 to duct 18 and the inlet 34 to the core compressor 30 downstream of the inlet 128 to duct 122 and the inlet to aft fan section 102 combine with the variable stator and variable inlet guide vane geometry of the front fan section 100, the aft fan section 102, the core compressor 30, the high pressure turbine 38, and the low pressure turbine 40 to provide a high degree of flow modulation with matched inlet airflow in the high bypass mode of operation without exceeding the energy extraction potential of the low pressure turbine.

The ability to modulate the flow through the bypass ducts and core engine over a wide range of rotor speeds, together with the ability to balance the core engine and inner duct static pressure prior to mixing over a wide range of inner duct stream dynamic pressures enables the variable bypass ratio engine of this embodiment to operate at higher bypass ratios and over a wider range of bypass ratios than the embodiments of FIGS. 1 and 3.

In addition to providing greater flow flexibility than the embodiment of FIGS. 1 and 3, the split fan embodiment of FIG. 7 enables the engine to operate at significantly higher thrust levels than prior art mixed flow engines without the use of an afterburner. Such high thrust may be achieved during non-afterburner subsonic flight by setting the variable stator 106 of the forward fan section 100 to the maximum flow setting while setting the inlet guide vane 114 and variable stators 116 and 118 of the aft fan section 102 for minimum flow and adjusting the variable area turbine nozzle diaphragm 48 open for high fan rotational speeds and large rates of bypass flow through duct 122. This increases the overall flow of the engine and adjusts the dynamic pressure level in outer bypass duct 122 in such a way as to increase the thrust produced from a given shaft power input into the two fan components.

Various changes could be made in the structures shown in FIGS. 1 through 7 without departing from the scope of the invention. For simplicity in design, the number of variable geometry components utilized has been kept to the minimum necessary to achieve the desired degree of flow variability; however, it is also possible to utilize other variable geometry components such as variable pitch rotor blades for the fan and turbine sections in order to achieve additional flexibility in flow modulation without departing from the scope of the invention.

Therefore, having described preferred embodiments of the invention, though not exhaustive of all possible equivalents, what is desired to be secured by Letters Patent of the United States is claimed below:

1. An improved gas turbine engine of the type having an inlet for supplying a gas flow to a core engine and duct means for bypassing a portion of the inlet gas flow around the core engine wherein the improvement comprises:
   means for modulating the bypass ratio of airflow through the duct means
   a mixer for injecting the bypass stream into the core engine exhaust stream including multiple position means for selectively varying the cross-sectional area through which the bypass stream is injected into the core engine exhaust stream and matching the static pressure of the bypass stream to the static pressure of the core engine exhaust stream prior to mixing the two streams and means for moving said cross-sectional area varying means to a plurality of different area positions in each of which the static pressure of the bypass stream is equalized with the static pressure of the core engine exhaust stream and the two streams thereafter mixed whereby the static pressures of the core and bypass streams may be matched at a plurality of different bypass ratios.

2. The gas turbine engine of claim 1 further comprising:
   variable geometry means for modulating the flow to the bypass duct means and core engine to vary the engine bypass ratio while contemporaneously maintaining the engine inlet airflow matched to an optimum design level as the bypass ratio is varied.

3. The gas turbine engine of claim 2 wherein the variable area mixer comprises:
   a passageway placing the bypass duct means in flow communication with the core engine exhaust stream,
   a plurality of rotatable cascaded vanes spanning the passageway, and
   actuator means for rotating the vanes about their respective center axis so as to vary the cross-sectional flow area through the passageway.

4. The gas turbine engine of claim 2 wherein the variable geometry means comprises:
   a variable area nozzle for exhausting the mixed bypass duct means and core engine gas streams.

5. The gas turbine engine of claim 4 further comprising:
   a fan disposed in the inlet to the engine upstream of the core engine and bypass duct means for compressing the gas flow to the bypass duct means and core engine,
   a low pressure turbine intermediate the core engine and passageway for supplying rotational energy to the fan, and
   wherein the core engine comprises a compressor, combustor and high pressure turbine in serial flow relation.

6. The gas turbine engine of claim 5 wherein the variable geometry means further comprises:
   variable angle vane means for varying the cross-sectional flow area of the fan.

7. The gas turbine engine of claim 6 wherein the variable geometry means further comprises:
   a variable area nozzle diaphragm intermediate the high and low pressure turbines.

8. The gas turbine engine of claim 7 wherein the variable geometry means further comprises:
   variable angle vane means for varying the cross-sectional flow area of the core engine compressor,
   variable angle vane means for varying the cross-sectional flow area of the high pressure turbine, and
   variable angle vane means for varying the cross-sectional flow area of the low pressure turbine.

9. The gas turbine engine of claim 4 further comprising:
   an afterburner disposed intermediate the mixer and exhaust nozzle.

10. The gas turbine engine of claim 1 wherein the cross-sectional area varying means comprises:
    a first cross-sectional area varying means disposed in said duct means for selectively accelerating the bypass flow to a supersonic velocity by varying the cross-sectional flow area of said duct means, and
    a second cross-sectional area varying means independent of said first cross-sectional area varying means and disposed downstream of said first cross-sectional area varying means for selectively varying the area through which the bypass stream is injected into the core stream whereby the first cross-sectional area varying means may be utilized to accelerate the bypass flow to a supersonic velocity and the second cross-sectional area varying means may be utilized to control the degree of expansion of the supersonic bypass flow prior to injection into the core stream.

11. The gas turbine engine of claim 10 further comprising:
    an outer engine nacelle,
    an annular wall separating the outer engine nacelle and core engine terminating downstream of the core engine such that the bypass duct means is formed intermediate the outer engine nacelle and annular wall,
    an annular centerbody of generally convex cross-section disposed on the inner face of the outer nacelle such that the convex face of the centerbody extends into the bypass duct means and is generally coplanar with the downstream end of the annular wall,
    an inner ring translatably disposed about the annular wall in a position to be extended downstream of the convex face of the centerbody such that downstream translation of the inner ring increases the area through which the bypass stream is injected into the core stream, and
    an outer ring of generally convex cross-section translatably disposed about the inner ring such that the convex face of the outer ring extends into the bypass duct means upstream of the convex face of the centerbody whereby translation of the outer ring in a downstream direction reduces the flow area of the bypass duct means causing the bypass gas stream to accelerate prior to injection into the core engine exhaust stream.

12. The gas turbine engine of claim 11 further comprising:
    variable geometry means for modulating the flow to the bypass duct means and core engine to vary the engine bypass ratio while contemporaneously maintaining the engine inlet airflow matched to an optimum design level as the bypass ratio is varied.

13. The gas turbine engine of claim 1 wherein the bypass duct means comprises:
    an inner bypass duct concentric to the core engine and in flow communication with the mixer, and
    an outer bypass duct concentric to the inner bypass duct and in flow communication with an outer duct exhaust nozzle.

14. The gas turbine engine of claim 13 wherein the variable area mixer comprises:
    a passageway placing the inner bypass duct in flow communication with the core engine exhaust stream,
    a plurality of rotatable cascaded vanes spanning the passageway, and
    actuator means for rotating the vanes about their respective center axis so as to vary the cross-sectional flow area through the passageway.

15. The gas turbine engine of claim 14 further comprising:
    a two-stage fan disposed in the inlet, having a first stage in flow communication with the outer bypass duct and a second stage disposed a predetermined distance downstream of the first stage and wherein the second stage is in flow communication with the inner bypass duct and core engine.

16. The gas turbine engine of claim 15 further comprising:
    variable geometry means for modulating the flow to the bypass duct means and core engine to vary the bypass ratio while contemporaneously maintaining the engine inlet airflow matched to an optimum design level as the engine bypass ratio is varied.

17. The gas turbine engine of claim 16 wherein the variable geometry means comprises:

means for varying the area of the outer bypass exhaust nozzle, means for varying the exhaust area of the mixed core engine and inner bypass duct gas stream, variable angle vane means for varying the cross-sectional flow area to the front fan section, and variable angle vane means for varying the cross-sectional flow area to the aft fan section.

18. A method of efficiently operating a gas turbine engine of the type which includes a core engine, a bypass duct around the core engine and a mixer for mixing the bypass duct flow stream with the core engine exhaust at a plurality of varying bypass ratios comprising the steps of:

a. selecting a first desired bypass ratio by varying the relative bypass and core engine gas flows, b. contemporaneously with step (a) varying the area through which the bypass stream is injected into the core engine exhaust stream such that the static pressures of the bypass and core streams are matched prior to mixing at said selected first bypass ratio, c. selecting another bypass ratio different from said first bypass ratio by varying the relative bypass and core engine gas flow, d. contemporaneously with step (c) varying the area through which the bypass stream is injected into the core engine exhaust stream such that the static pressure of the bypass and core streams are matched prior to mixing at said different bypass ratio, and e. repeating steps (c) and (d) each time a different bypass ratio is desired.

19. The method of claim 18 further comprising the step of:

selectively accelerating the bypass flow to a supersonic velocity by varying the flow area of the bypass duct upstream of the point at which the bypass stream is injected into the core exhaust stream such that the supersonic bypass flow may be controlled in degree of expansion prior to injection into the core stream.

20. The method of claim 19 further comprising the step of contemporaneously modulating the flow to the core engine and bypass duct so as to maintain the inlet airflow matched to an optimum design level as the bypasss ratio is varied.

* * * * *